June 9, 1953 E. H. B. BARTELINK 2,641,755

SHORT-WAVE DIRECTIONAL RADIO COMMUNICATION SYSTEM

Filed Nov. 22, 1950 2 Sheets-Sheet 1

INVENTOR.
EVERHARD H. B. BARTELINK.

BY Ward, Crosby & Neal.
ATTORNEYS.

June 9, 1953 E. H. B. BARTELINK 2,641,755

SHORT-WAVE DIRECTIONAL RADIO COMMUNICATION SYSTEM

Filed Nov. 22, 1950 2 Sheets-Sheet 2

INVENTOR.

EVERHARD H. B. BARTELINK.

BY Ward, Crosby & Neal.

ATTORNEYS.

Patented June 9, 1953 2,641,755

UNITED STATES PATENT OFFICE 2,641,755

SHORT-WAVE DIRECTIONAL RADIO COMMUNICATION SYSTEM

Everhard H. B. Bartelink, Bronxville, N. Y., assignor, by mesne assignments, to Automatic Electric Laboratories, Inc., Chicago, Ill., a corporation of Delaware Application November 22, 1950, Serial No. 197,101

20 Claims. (Cl. 343—100)

This invention pertains to short-wave, directional radio communication systems, and more particularly to a radio telephone system comprising a central office and outlying stations, operating on extremely short wave-lengths for beaming the radio waves between the central office and the various outlying or subscriber's stations. The outlying stations may have fixed locations, such as in the homes of telephone subscribers, or may be mounted on moving objects, such as automobiles, planes, trains, etc.

The invention, in accordance with one of its modifications, is especially adapted for providing telephone service in sparsely settled regions where the cost of providing telephone lines from a central office to the various subscribers' homes becomes prohibitive. Under such circumstances, microwave radio transmission provides a feasible solution. By the use of microwaves, i. e., radio waves of, for example, about three to fifty centimeters, more or less, sharply delineated beams of radio energy may be directed along rectilinear paths between the central office and the individual stations, thereby to provide privacy of communication in a relatively cheap and efficient manner.

For beaming the microwaves to individual outlying stations having fixed locations, the central office might be provided with an equal number of directive aerials individually so mounted as to transmit to and receive from the individual outlying stations respectively. This arrangement would be cumbersome, complicated and unduly expensive. Another possibility would be to employ at the central office a fewer number of directive aerials so mounted about a common axis as to serve successive sectors of the area about the central office comprising in aggregate all directions of the compass as viewed therefrom. This proposal is objectionable in that transmission and reception are non-uniform over any given sector being best along the median line thereof and least along the edges. Also stations located along the fringes of a sector are subject to interference or cross-talk from the adjacent sector.

In accordance with the present invention, I propose to overcome the above-noted objections by providing the central office with a normally rotating directive antenna system and associated radio transmitting and receiving equipment adapted to provide a radio link to any of the outlying stations, it being understood that this link can serve only one outlying station at a time. It will also be understood that if traffic conditions warrant, additional radio links of a similar character may be provided as explained hereinafter. Hence the operation of only one link will be explained for the moment.

Each outlying or subscriber's station is provided with a normally operating radio receiver and a normally inoperative radio transmitter, to which the subscriber's telephone set is connected. The radio transmitter and receiver units extend to a directive antenna system directed toward the central office. During periods when the system is not in use, the central office antenna rotates continuously at the rate of a few seconds per revolution in search of outlying stations desiring to place a call.

To place a call, a subscriber at an outlying station removes his receiver from the hook. This cuts in his local transmitter for beaming a carrier wave toward the central office. As the rotating central office antenna approaches the direction of the station in question, it picks up the carrier wave beamed therefrom. This operates a carrier relay in the central office radio receiver which operates to signal the operator and to stop the antenna rotation and to hold it in the direction of the calling station until the subscriber hangs up. The operator thereupon connects her telephone set to the central office radio transmitting and receiving equipment to switch on the transmitter, the receiver being continuously operating. The radio channel or link is now in condition for carrying on a two-way conversation between the calling subscriber and the operator. If the subscriber desires a long distance or local wire connection, the operator completes the call in the usual way. At the conclusion of the call, the subscriber hangs up, his transmitter is thereby cut off, and the central office carrier relay released to start the antenna rotating again. When the operator disconnects, the central office transmitter is also cut off.

In order to provide means for the operator to originate a call to any of the outlying stations, there are disposed about the rotating antenna shaft, a plurality of stationary contacts individually posiitoned in the radial directions of the outlying stations respectively. As the antenna shaft rotates, a contact arm mounted thereon sweeps over these contacts successively. The operator is provided with a dial switch having fixed contacts arranged in conformity with the fixed contacts disposed about the antenna shaft and wired thereto respectively. The dial switch is provided with a manually rotatable switch arm adapted to contact the fixed contacts thereof successively.

In order to originate a call to an outlying station, the operator rotates the contact arm of the dial switch to the fixed contact corresponding to the station desired and connects her telephone set to the central office radio transmitting and receiving equipment. As the antenna shaft rotates, the contact arm thereon will ultimately engage the associated fixed contact thereof, which is wired to the fixed contact at which the dial switch has been set. When this occurs, a circuit is completed to stop the antenna rotation, thereby to hold the antenna pointed in the direction of the station to be called. The operator thereupon applies a suitable source of ringing current, such as a periodically interrupted, high frequency, modulating current, to the central office radio transmitter, whereby the so-modulated carrier wave beamed to the called station, rings the subscriber who answers in the usual manner. At the conclusion of the call, the operator disconnects and the subscriber hangs up, thereby to close the control circuit for again initiating rotation of the antenna, which continues to rotate until a new call is placed.

In accordance with another modification of the invention, the central office antenna is provided with additional means for automatically tracking moving objects, whereby two-way, microwave, radio telephone service may be carried on between the central office and remote stations mounted in moving objects, such as automobiles, trains, planes, etc., this modification being also adapted for automatically aligning the central office antenna with the precise direction of a remote station during communication therewith, whether such station has a fixed or moving location.

Having thus described the invention in general terms, reference will now be had to the accompanying drawings for a more detailed description, wherein:

Fig. 2 illustrates in similar fashion the central office antenna system and appurtenant apparatus and circuits, as modified for automatically tracking outlying stations mounted on moving objects and employing to this end a dual lobe directive antenna as part of the automatic tracking equipment; while Fig. 3 is a graphical representation of the dual lobe arrangement of the aforesaid antenna array.

Figure 1:
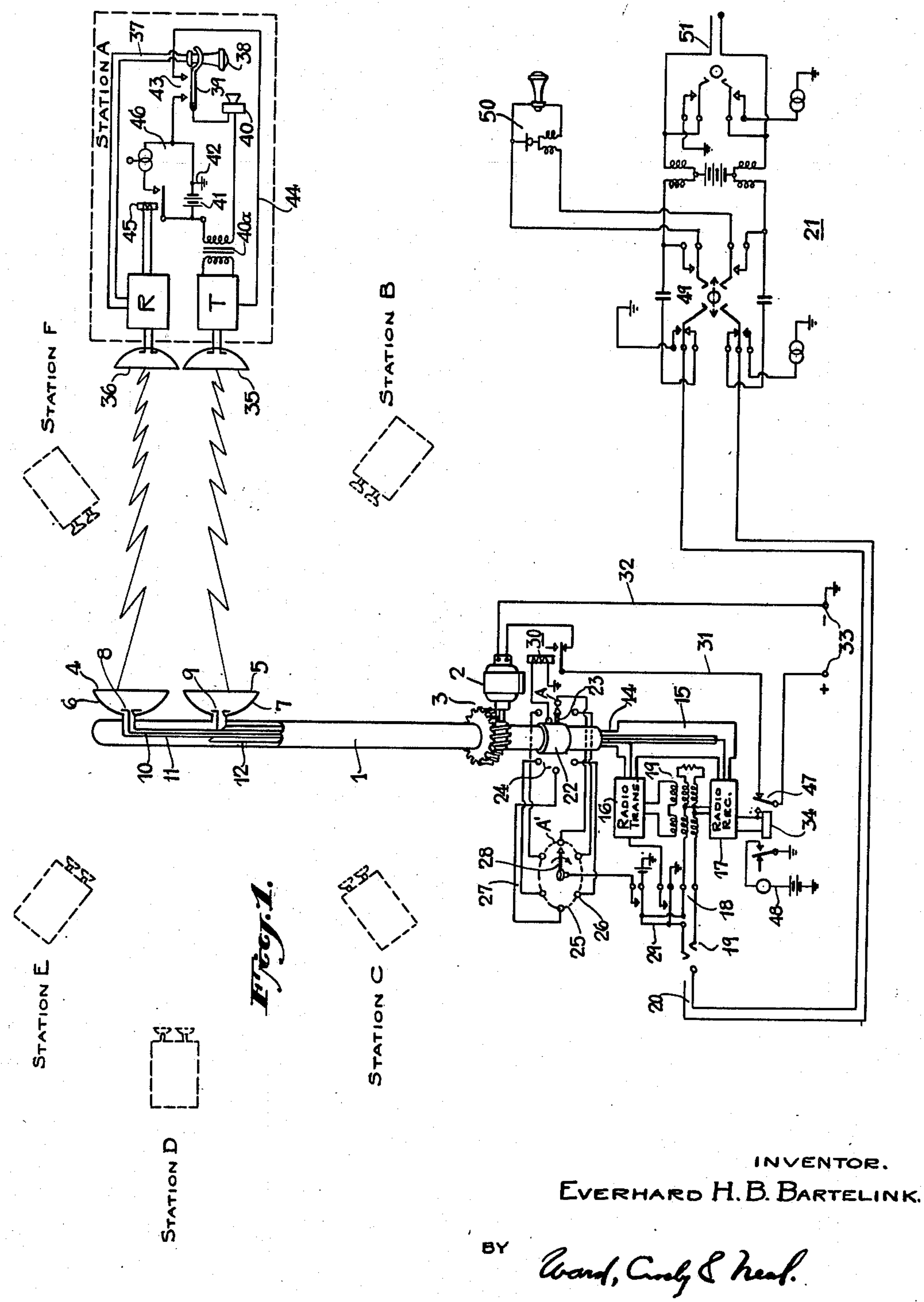
Fig. 1 illustrates more or less schematically and diagrammatically the modification of the invention first above described, for effecting microwave radio communication between the central office and outlying stations having fixed locations.

Referring now to Fig. 1, there is shown at 1 a vertically disposed shaft, of insulating material, adapted to be continuously rotated above its axis by means of a motor 2 geared to the antenna shaft through worm and pinion gearing 3, thereby to impart to shaft 1, continuous rotation at the rate of a few seconds per revolution. Shaft 1 is of course mounted in suitable bearings, preferably ball or roller bearings, which, however, have been omitted for simplicity of illustration. The shaft 1 may be mounted at any convenient location at the central office, for example, upon the roof thereof.

Rigidly secured to the shaft in vertical alignment are a pair of directional transmitting and receiving antennas 4, 5, each comprising preferably a parabolically shaped metal dish, such as 6, 7, made of aluminum or the like, at the focus of which is mounted a dipole antenna, such as 8, 9. The halves of the dipole 8 are connected respectively to inner and outer, preferably concentric conductors 10, 11, extending axially down the interior of the antenna shaft 1. Similarly, the halves of dipole 9 are connected respectively to concentric conductors 11, 12. The concentric conductors extend the length of the antenna shaft and project beyond the base thereof, as at 14, and thence into a rotatable concentric conductor joint 15, the latter being illustrated diagrammatically since joints of this type are well known. From the rotating joint 15, a concentric conductor connection extends to the output of a microwave radio transmitter 16, while another similar connection extends to the input of a microwave radio receiver 17. It will be understood that transmitter 16 is thus connected to conductors 10, 11 extending to the transmitting antenna 4; while receiver 17 is connected to conductors 11, 12 extending to the receiving antenna 5.

The input to transmitter 16 and the output of receiver 17 are connected to conductors 18 through a hybrid coil 19 in the conventional manner for minimizing reradiation of received signals, conductors 18 in turn terminating in a jack 19 on the operator's switchboard. Jack 19 is adapted to receive a corresponding plug 20 of an operator's cord circuit and associated telephone set, shown generally at 21.

The antenna shaft 1 is provided near its lower end with a metal collar 22 having integral therewith a horizontally extending switch arm 23 adapted, during rotation of shaft 1, to sweep across and successively engage a series of stationary contacts, such as 24, disposed about shaft 1 in directions corresponding to the directions of the various subscriber stations, as referred to hereinafter. Mounted adjacent the operator's jack 19 is a dial switch 25, having a series of stationary contacts, such as 26, radially disposed in conformity with the radial dispositions of the stationary contacts 24 positioned about the antenna shaft. The contacts 26 of the dial switch are wired to the corresponding contacts about the antenna shaft by means of the connections, such as 27. The dial switch 25 is provided with a manually rotatable knob having secured thereto a rotatable switch arm 28 adapted to engage the stationary contacts thereof successively, as the knob is rotated.

Associated with jack 19 is a switch 29, actuated upon insertion of plug 20 into the jack. Switch 29 is provided with a lower set of contacts for applying ground, as shown, to the radio transmitter 16 upon insertion of the plug 20 into the jack 19, thereby to energize the transmitter. Switch 29 is also provided with a pair of upper contacts for applying, as shown, a grounded battery to the rotatable arm 28 of the dial switch 25 upon insertion of the plug into the jack. Bearing against the metal collar 22 carried by shaft 1, is a wiping brush from which a connection extends through a relay 30 to ground as shown.

The electrical motor 2 which rotates the antenna shaft 1, as above explained, is normally energized over a pair of leads 31, 32 from a power supply connected to terminals 33. The input connection 31 to the motor is wired through normally closed back contacts of relay 30, and is also wired in series therewith through normally closed back contacts of a carrier-actuated relay 34, connected to the radio receiver as explained hereinafter.

Disposed about the central office at various distances and in various directions therefrom are a series of subscriber's stations, as indicated by stations A to F inc., these stations being individually disposed in directions from the central office corresponding to the dispositions of the stationary contacts 24 mounted about the antenna shaft 1 at the central office.

Each subscriber station comprises, as shown in detail for station A, a radio transmitter T and a radio receiver R. The output of radio transmitter T is connected to a directive aerial 35 comprising a dipole antenna mounted at the focus of a parabolic metal reflector so positioned as to beam the energy transmitted from the radio transmitter T to the central office receiving antenna 5. Similarly, the input to the radio receiver R is connected to a directive aerial 36, so positioned as to receive radio energy beamed thereto from the radio transmitting antenna 4 at the central office.

The output of the radio receiver R is connected over leads 37 to the telephone receiver 38, normally positioned on the switch hook 39 of the telephone set. The subscriber's microphone transmitter 40 is coupled to the input of the radio transmitter T through a two-winding, isolating transformer 40a, the primary circuit of which includes a battery 41 having its negative terminal grounded as at 42, which primary circuit is closed at the switch hook contacts 43 to energize the microphone transmitter upon removal of the receiver from the switch hook. The switch hook is provided with an additional, normally open contact connected over a lead 44 to the radio transmitter T, for switching on the transmitter upon removal of the receiver from the switch hook, this being accomplished by the connection of the ground 42 to lead 44 through the switch hook contacts upon removal of the receiver from the switch hook. For purposes of ringing the station, the circuit of the radio receiver R includes a carrier-actuated relay 45, which relay controls, through its contacts, a local circuit 46 for operating a buzzer or bell from battery 41 as shown.

In the operation of the system, the radio receiver 17 at the central office, and those at the various subscriber stations, such as receiver R at station A, are normally in operation. Also the antenna shaft 1 is normally being rotated by motor 2 to cause the central office antennas 4, 5 continuously to sweep around in the directions of the various subscriber station successively. Assuming now that a subscriber, such as station A, desires to call the central office, the subscriber will remove his receiver 38 from the switch hook, thereby completing the circuit to ground at 42 over connecetion 44 to energize the subscriber's radio transmitter 35. Energization of the transmitter will cause carrier wave energy to be beamed from the subscriber's transmitting antenna 35 in the direction of the central office. As the antenna shaft swings around to point its antennas in the direction of the calling station, the receiving antenna 5 will pick up the carrier wave being beamed from the subscriber's transmitting antenna and transmit the same to the central office radio receiver 17, thereby to operate the carrier-actuated relay 34. Operation of this relay accomplishes two things. First, it opens at its contacts 47 the power supply circuit for motor 2, thereby stopping the motor and with it the antenna shaft, so that the shaft is brought to rest with its antennas 4, 5 pointing in the direction of the calling station. Operation of relay 34 also closes, through its left front contacts, a signalling circuit 48 to signal the operator.

The operator thereupon inserts the plug 20 of her cord circuit into jack 19. Switch 29 is thereby actuated to apply ground to the radio transmitter 16 and thus energize the transmitter. The operator thereupon actuates key 49 of her cord circuit to the right to connect her telephone set 50 to the radio transmitting and receiving equipment 16, 17 over the cord circuit. If the calling station seeks a long-distance or further connection over a metallic line, the operator completes the call in the usual way by plugging her back cord 51 into an appropriate jack and ringing.

At the conclusion of the call, the subscriber hangs up, thereby cutting off his transmitter at the contacts of his receiver switch as above explained. This terminates the transmission of carrier from his station to the central office, thereby causing the carrier-actuated relay 34 thereat to release. Similarly, when the operator removes plug 20 from jack 19, the central office transmitter 16 is cut off by the opening of the lower contacts of switch 29, thus terminating the transmission of carrier energy from the central office to the calling station. The release of relay 34 closes the power supply circuit for motor 2, whereby the central office antenna starts rotating antenna starts rotating and searching again.

Assume now that the central office desires to initiate a call to one of the subscriber stations, such as station A. The operator adjusts the dial switch 25 until its switch arm 28 engages the contact, such as A, corresponding to station A to be called. The operator thereupon inserts plug 20 into jack 19 to switch on the central office transmitter, as explained, and also operates switch 29 to connect the battery to the switch arm of the dial switch. Meantime, the antenna wil continue to rotate until switch arm 23 thereof engages contact A corresponding to the station selected. Thereupon relay 30 will operate to open the power circuit of motor 2, thereby bringing the motor and antenna shaft to rest with the antennas 4, 5 pointing in the direction of station A. Short-wave radio energy will now be beamed from the central office transmitting antenna 4 to the selected subscriber station, and will be picked up by his receiving antenna 36 thereat. This will pull up the carrier relay 45 which will thereafter rapidly operate and release in response to ringing by the central office operator, and thus actuate the bell or buzzer in the local subscriber's ringing circuit 46. When the subscriber answers by removing his receiver 38 from the switch hook, his radio transmitter is energized, as explained, and the system is thereupon operable for carrying on communication between the subscriber and the central office operator.

At the conclusion of the call, the subscriber hangs up, thereby cutting off his transmitter, thus releasing the carrier relay 34 at the central office as explained. Also, the central office operator disconnects her cord 20 from jack 19, thus releasing relay 30 at the central office. This closes the motor circuit starting the antenna rotating and searching again. It should be pointed out, in this connection, that the motor will not start rotating until both the subscriber hangs up and the operator disconnects, by reason of the fact that the motor power supply circuit is under control of relays 30 and 34 in series, the operation of relay 30 being under the operator's control, and the operation of relay 34 being under the subscriber's control, as above explained.

The central office apparatus above described can of course be duplicated to the extent required to meet traffic conditions, in the event that traffic is sufficiently heavy that one rotating aerial can not handle all calls without undue delay.

Figures 2, 3:
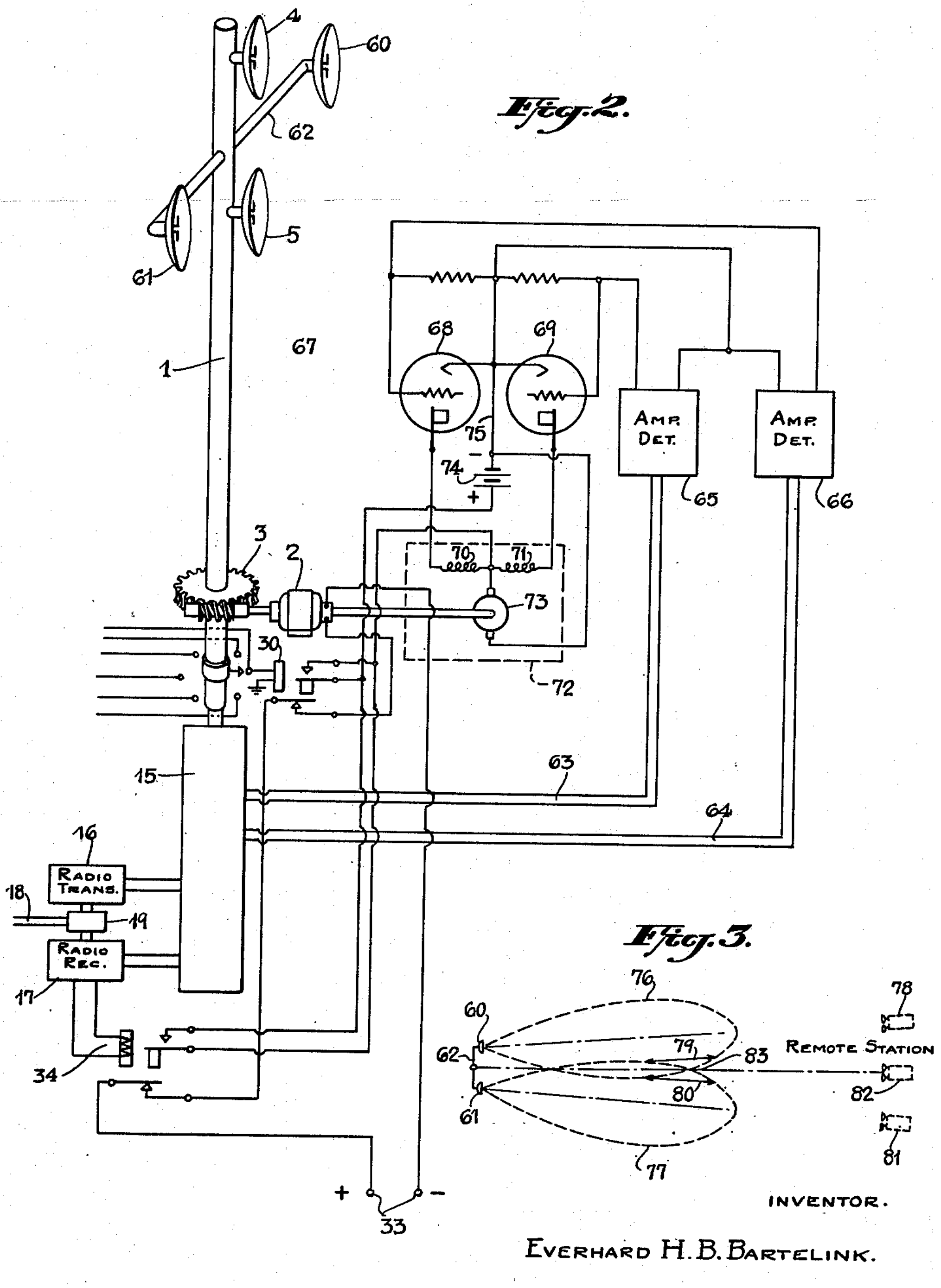

Referring to the automatic tracking antenna system of Fig. 2, components which are the same as in Fig. 1 are similarly designated and hence require no further description. In this modification, the antenna shaft 1, in addition to mounting the vertically aligned transmitting and receiving antennas 4, 5, also mounts a pair of horizontally spaced, directional antennas 60, 61, carried by a cross-arm 62, this being the dual lobe antennas employed for the automatic tracking.

Antennas 60, 61 are connected over coaxial lines, similar to 10—12, Fig. 1, to the rotating joint 15, from whence coaxial lines 63, 64 connect these antennas respectively to a pair of amplifier-rectifier units 65, 66, the rectified outputs of which are oppositely applied to the opposite halves of a balanced amplifier 67. This amplifier contains a pair of amplifier tubes 68, 69, connected push-pull as shown, the plate circuits of which contain respectively the shunt field windings 70, 71 of an reversible motor 72, the armature 73 of which is mounted on the same shaft as that of the antenna search motor 2, as shown.

The plate circuits of tubes 68, 69 are energized from a battery 74 contained in the common plate current return lead 75 of amplifier 67, this plate-lead 75 being wired through normally open upper contacts in multiple of relay 30 and 34, and thence to the midpoint between the shunt field windings 70, 71 of the reversible motor 72. The armature 73 of this motor is connected through one brush to the midpoint between its field windings 70, 71, and through another brush to the negative side of battery 74, in consequence of which the reversible motor 2 is wholly deenergized so long as relays 30 and 34 are released, but is energized in the manner explained hereinafter, upon operation of either of these relays.

Now, as was explained above, in connection with Fig. 1, the search motor 2 receives power from terminals 33 over a circuit traced through the back contacts of relays 30 and 34, so that motor 2 is continuously energized to rotate the antenna system for searching, during periods that the central office system is idle. As soon, however, as an incoming or outgoing call is placed, either relay 30 or 34 operates, as explained above, to open up the power supply circuit to motor 2, thereby to deenergize this motor and arrest the antenna system when pointing in the direction of the remote station to which a call is being placed.

As soon, however, as relay 30 or 34 operates to deenergize the search motor 2 as aforesaid, the operation of this relay closes, through its front contacts, the plate circuit above traced of the balanced amplifier 67, thereby to energize the armature of the reversible motor 72, the relative energizations of the field windings 70, 71 of which, however, will depend on the relative signal intensities incident from the remote station on the automatic tracking antennas 60, 61. That is to say, if at the moment motor 2 is deenergized, the antenna system is pointing precisely toward the remote station, antennas 60, 61 will receive equal signal intensities therefrom, to produce equal and opposite currents flowing through the field windings 70, 71 of the reversible motor 72, in consequence of which no rotative torque will be applied to the armature 73 thereof, in consequence of which the antenna system will remain stationary. If, however, the antenna system is not brought to rest pointing directly toward the remote station, one of the antennas 60, 61 will receive a stronger signal that the other, as a result of which the current in one or the motor field windings 70, 71 will be greater than in the other, the unbalanced current component being always in such direction as to rotate the armature 73 thereof in a direction to line the antenna system precisely with the direction of the remote station.

Should the remote station be mounted on a mobile unit, such as an automobile, train, plane, etc., the antenna system will locate and automatically track the remote station as it moves along, by operation of the antenna mechanism above described. The motion of the mobile unit will, in general, have a component transverse to the radial direction of the antenna system, which will tend continually to produce a greater signal intensity on one of the dual lobe antennas 60, 61 than on the other. In consequence, a correcting unbalanced current component will flow in the motor field windings 70, 71, in such direction as to energize the rotor 73 thereof in a direction to swing the antenna system into continual alignment with the moving object.

It will be observed that in the operation of the Fig. 2 system, motors 2 and 72 can not be energized concurrently, inasmuch as one motor is energized through the back contacts of relays 30 and 34, while the other motor is energized through the front contacts thereof. Therefore, when relays 30 and 34 are released to energize motor 2 for searching, the rotor of the automatic tracking motor 72 merely idles around, the reverse being true when relay 30 or 34 is operated to energize motor 72 and concurrently to deenergize the search motor 2.

Fig. 3 is a view looking down from above on the horizontally spaced, automatic tracking antennas 60, 61 of Fig. 2, the dashed lines 76, 77 of Fig. 3 graphically depicting the lobes or field intensity or sensitivity patterns of these antennas respectively during transmission or reception. It will be observed that antennas 60, 61 are not mounted with their axes parallel, but rather with their axes slightly diverging to spread the lobes as indicated. The purpose of this is to enhance the difference component between the signal intensities received by the two antennas respectively, when the antenna system is "off-target" from the true direction of the remote station. Thus, assuming the remote station to be at 78, the signal intensity difference component on the two antennas for swinging the antenna system in alignment with the station at 78 is indicated by the full line 79. Similarly, the lobe difference, correcting component 80 would result if the remote station were in the direction 81. However, when the remote station is in precise alignment with the antenna system, as at 82, the lobe difference component will reduce to zero, as indicated at 83, so that no further correction will be applied to the antenna adjustment.

The mobile units may of course be equipped with automatic tracking antenna systems, generally similar to Fig. 2, but this would be uneconomical. A preferred arrangement is to equip the mobile units with stationary antennas of the so-called "pancake lobe" type, i. e., those which receive and transmit equally well in all horizontal directions, but which have relatively small components in the vertical direction. Antennas of this character are well known and hence require no detailed description or illustration herein. By mounting on the mobile units, transmitting and receiving antennas of this character in substantially axial alignment but vertically spaced from each other, their resulting lobes will be vertically spaced at the mobile unit, thereby to isolate the radio transmitting and receiving channels thereat, thus to prevent feedback from the transmitter into the receiver of the mobile unit.

Reverting to Fig. 1, the switch arm and contact arrangements 23, 24 and 26, 28, for directing the aerial toward a called station, can of course be replaced by a selsyn motor arrangement, in which event only the fixed contacts 24 and the rotating switch arm 23 would be retained about the antenna shaft. This modification would provide increased flexibility of preselection and direction of the antenna, inasmuch as the operator could thereby direct the antenna toward any point in the compass, with reference to a graduated dial on the selsyn motor control unit.

I claim:

1. A short-wave radio communication system comprising a central office and a plurality of stations remotely disposed thereabout, each equipped with radio transmitter and receiver; a directional antenna system rotatably mounted at the central office to scan said stations successively during rotation; means for continuously rotating said antenna preparatory to the transmission of a carrier wave from one of said stations; and means at said central office responsive to a carrier wave transmitted from any one of said stations for arresting said antenna rotation, with the antenna pointing toward said station, and for thereafter releasing said antenna to continue said continuous rotation upon cessation of said carrier wave.

2. A short-wave radio communication system comprising a central office and a plurality of stations remotely disposed thereabout, each equipped with radio transmitter and receiver; a directional antenna system at each station positioned to direct a radio beam from the transmitter thereat toward said central office and for receiving a radio beam directed from the central office thereto; a directional antenna system rotatably mounted at the central office for scanning said stations successively during rotation; means for continuously rotating said antenna preparatory to the transmission of a radio beam from one of said stations; and means including a relay at the central office responsive to a radio beam transmitted from any one of said stations for arresting the antenna rotation with the antenna pointing toward said station, and for thereafter releasing said antenna to resume continuous rotation thereof upon termination of said radio beam transmission.

3. A short-wave radio telephone system comprising a central office and a plurality of stations remotely disposed thereabout, each equipped with a normally energized radio receiver and a normally deenergized radio transmitter; a directional antenna at each station positioned to direct toward the central office a radio beam transmitted therefrom and to receive a radio beam directed from the central office thereto; a telephone set at each station connected to the radio transmitter and receiver thereat, said set including a switch for energizing the associated radio transmitter; a directional antenna rotatably mounted at the central office for scanning said stations successively during rotation; means for continuously rotating said antenna preparatory to the transmission of a radio beam from any one of said stations; means at the central office including said rotating antenna and a relay thereat, responsive to a radio beam transmitted from any one of said stations for arresting the antenna rotation with the antenna pointing to said station, and for concurrently signalling at the central office; a telephone set at the central office; and means for connecting said set to the radio transmitter and receiver thereat, thereby to energize the transmitter for effecting two-way communication between the central office and the said station.

4. A short-wave radio communication system comprising a central office and a plurality of stations remotely disposed thereabout, each equipped with radio transmitter and receiver; a directional antenna rotatably mounted at the central office for scanning said stations successively during rotation; means for continuously rotating said antenna preparatory to the initiation of a call from any one of said stations; and means at the central office operating responsive to the initiation of a call from any one of said stations for automatically arresting said central office antenna rotation, with the antenna thereof pointing to said one of said plurality of stations initiating a call.

5. A short-wave radio communication system comprising a central office and a plurality of stations remotely disposed thereabout, each equipped with radio transmitter and receiver; a directional antenna rotatably mounted at the central office for scanning said stations successively during rotation; means for continuously rotating said antenna preparatory to the initiation of a call from said central office to any of said stations; and means at the central office responsive to the initiation of a call from said central office to any of said stations for automatically arresting said central office antenna rotation, with the antenna thereof pointing to a preselected one of said plurality of stations, said second means including a disabling circuit for said first means, said disabling circuit comprising a plurality of contacts disposed about said rotatable antenna in the radial directions of said stations respectively, and a switch arm rotatable by and with said antenna for engaging said contacts successively during rotation for completing said disabling circuit.

6. A short-wave radio communication system comprising a central office and a plurality of stations remotely disposed thereabout, each equipped with radio transmitter and receiver; a directional antenna at each station positioned to direct toward the central office a radio beam transmitted therefrom; an antenna at the central office rotatably mounted to scan said stations successively during rotation; means for continuously rotating said antenna preparatory to the transmission of a radio beam from any one of said stations and preparatory to the initiation of a call from said central office to any one of said stations; means including said rotating antenna and a relay at the central office, responsive to a radio beam transmitted from any one of said stations for arresting said central office antenna rotation, with the antenna thereof pointing toward said station, and for releasing said antenna to resume rotation upon cessation of said radio beam transmitted from said station; and means at the central office for automatically arresting said central office antenna rotation upon the initiation of a call from said central office, with the antenna thereof pointing to any preselected station of said plurality.

7. A short-wave radio communication system comprising a central office and a plurality of stations remotely disposed thereabout, each equipped with radio transmitter and receiver; a directional antenna at each station positioned to direct toward the central office a radio beam transmitted therefrom; an antenna at the central office rotatably mounted to scan said stations successively during rotation; means for continuously rotating said antenna preparatory to the transmission of a radio beam from any one of said stations and preparatory to the initiation of a call from said central office to any one of said stations; means including said rotatable antenna and a relay at the central office, responsive to a radio beam transmitted from any one of said stations for arresting said central office antenna rotation, with the antenna thereof pointing toward said station, and for releasing said antenna to resume rotation upon cessation of said radio beam transmitted from said station; and means at the central office for automatically arresting said central office antenna rotation, with the antenna thereof pointing to any preselected station of said plurality, said last-named means including a disabling circuit for said first means, said disabling circuit including fixed contacts disposed about said rotating antenna in the radial directions of said stations respectively, together with a switch arm carried by and rotating with said antenna for engaging said contacts successively for completing said disabling circuit.

8. In a short-wave radio communication system: a rotatably mounted directional antenna adapted for searching and establishing communication with fixed and mobile remote stations; means at said antenna for continuously rotating said antenna preparatory to the transmission of a signal from one of said remote stations; means responsive to signals received from one of said remote stations for automatically stopping the antenna when directed thereto; and means for thereafter causing said antenna automatically to follow said remote station if mobile, so long as signals are received therefrom.

9. In a short-wave radio communication system: a rotatably mounted directional antenna adapted for searching and establishing communication with fixed and mobile remote stations; means for continuously rotating said antenna preparatory to the transmission of signals from one of said remote stations; means including a relay responsive to signals picked up by said antenna from one of said remote stations for automatically stopping the antenna when directed thereto; and means for thereafter causing said antenna automatically to follow the direction of said remote station, if moving, so long as signals are received therefrom.

10. In a short-wave radio communication system: a rotatably mounted directional antenna adapted for searching and establishing communication with fixed and mobile remote stations; means for continuously rotating said antenna preparatory to the transmission of signals from one of said remote stations; means including a relay responsive to signals picked up by said antenna from one of said remote stations for automatically stopping the antenna when directed thereto; and means including said antenna, a balanced amplifier and a reversible motor responsive thereto, for causing said antenna thereafter automatically to follow the direction of said remote station if mobile, so long as signals are received therefrom.

11. In a short-wave radio communication system: a rotatably mounted directional antenna adapted for searching and establishing communication with fixed and mobile remote stations; means for continuously rotating said antenna preparatory to the transmission of signals from one of said remote stations and preparatory to the initiation of a call from said rotating antenna; means including a first relay for stopping said antenna when pointing in any preselected direction for calling one of said remote stations; means including a second relay responsive to signals picked up by said antenna from one of said remote stations for stopping the antenna when directed thereto; and means for causing said antenna automatically to follow the direction of said station if mobile during reception of signals therefrom.

12. In a short-wave radio communication system: a rotatably mounted directional antenna adapted for searching and establishing communication with fixed and mobile remote stations; means for continuously rotating said antenna preparatory to the transmission of signals from one of said remote stations and preparatory to the initiation of a call from said rotating antenna; means including a first relay for stopping said antenna when pointing in any preselected direction for calling one of said remote stations; means including a second relay responsive to signals picked up by said antenna from one of said remote stations for stopping the antenna when directed thereto; and means including said antenna, a balanced amplifier and a reversible motor for causing said antenna thereafter automatically to follow the direction of said station if mobile during signal reception therefrom.

13. In a short-wave radio communication system: a rotatably mounted antenna shaft; directional antenna means mounted thereon for establishing communication with mobile remote stations; means continuously rotating said antenna preparatory to the transmission of signals from one of said remote stations; means including a relay responsive to signals picked up by said antenna means for stopping said antenna rotation when directed thereto; and means including a pair of horizontally spaced directional antennas carried by said shaft, a balanced amplifier and a reversible motor responsive thereto, for causing said antenna thereafter automatically to follow the direction of said station.

14. In a short-wave radio communication system: a rotatably mounted antenna shaft; directional antenna means mounted thereon for establishing communication with remote stations; means for continuously rotating said antenna preparatory to the transmission of signals from one of said remote stations and preparatory to the stopping of said antenna in a certain radial direction; means including contacts disposed about said shaft, a switch arm carried thereby and a first relay responsive thereto for stopping said shaft rotation with said antenna means pointing in the radial direction of any said contact; and means including a second relay responsive to signals picked up by said antenna from one of said remote stations for stopping the antenna rotation when directed to said station.

15. In a short-wave radio communication system having a central office and a plurality of stations remotely disposed thereabout, each of said stations having a transmitter and receiver, a directional antenna system rotatively mounted at the central office, said antenna system so mounted as to scan each of said stations successively as said antenna system is rotated, a motor coupled to said antenna system for continuously rotating said antenna system preparatory to the transmission of a carrier wave from one of said stations, an operating circuit for said motor whereby said motor operates to continuously rotate said antenna system, a radio receiver at said central office connected to said antenna system whereby said radio receiver at said central office will receive a carrier wave transmitted from one of said stations when said antenna system scans said one station, a relay associated with said radio receiver at said central office, said relay operated responsive to the reception by said radio receiver at the central office of a carrier wave from one of said stations, a first pair of contacts of said relay, said first pair of contacts connected in series in said operating circuit for said motor, said first pair of contacts closed when said relay is not operated, a second pair of contacts of said relay, signalling means at said central office for signalling the reception by the radio receiver at the central office of a carrier wave from one of said stations, said second pair of contacts associated with said signalling means whereby the operation of said second pair of contacts operates said signalling means, so that when said antenna system scans one of said stations transmitting a carrier wave said relay is operated to open said motor circuit causing said antenna system to stop directed toward said station and is operated to signal said central office.

16. In a short-wave radio communication system having a central office and a plurality of stations remotely disposed thereabout, each of said stations having a transmitter and a receiver, a fixed directional transmitter antenna and a fixed directional receiver antenna mounted at each station and directed toward said central office, a telephone at each station connected to said transmitter and receiver thereat, said receiver at each station continuously operating, signalling means associated with each of said continuously operating receivers operated responsive to the reception by said receivers of a carrier wave from said central office for signalling said station, a directional antenna system rotatively mounted at said central office, said antenna system comprising a directional transmitter antenna and a directional receiver antenna, said antenna system so mounted as to scan each of said stations successively as said antenna system is rotated, a motor coupled to said antenna system for continuously rotating said antenna system preparatory to the extension of a call from said central office, an operating circuit for said motor whereby said motor operates to continuously rotate said antenna system, manual means at said central office for selecting one of said stations, means associated with said motor circuit operated responsive to said last mentioned means for breaking said operating circuit for said motor to cause said motor to stop thereby causing said antenna system to stop directed toward said selected station, a transmitter at said central office connected to said transmitter antenna mounted thereat, manual means for energizing said transmitter to cause a carrier wave to be transmitted from said transmitter antenna mounted thereat to said selected station, whereby said signalling means at said selected station is operated to signal said station.

17. In a system as claimed in claim 16, said first means comprising a carrier operated relay, a ringing circuit including a pair of contacts of said carrier operated relay whereby the operation of said carrier operated relay completes said ringing circuit to signal said station and manually operated means at said station for energizing said transmitter at said station whereby a modulated carrier wave is transmitted from said station to said receiver antenna at said central office.

18. In a system as claimed in claim 16, said second means comprising a ring of contacts, one of said contacts associated with each of said stations, a manually movable contact arm, said contact arm rotatable to make contact successively with each of said ring of contacts, a second contact arm mounted on said antenna system thereby rotating with said antenna system, a second ring of contacts disposed about said antenna system so that as said antenna system rotates said second contact arm successively contacts said second ring of contacts, each of said second ring of contacts associated with one of said stations and connected to the comparable contacts of said first ring of contacts, said third means comprising a relay, a pair of closed contacts of said relay in series in said motor circuit, an operating circuit for said relay including said second contact arm, one of said contacts of said second ring of contacts associated with one of said stations, the comparable one of said contacts of said first ring of contacts, and said movable first contact arm, so that said first contact arm is moved to make contact with one of said contacts of said first ring of contacts to select one of said stations, whereby said operating circuit for said relay is completed when said second contact arm rotates to contact the contact of said second ring of contacts connected to the selected contact of said first ring of contacts, whereby said relay is operated to open its pair of contacts to break the operating circuit for said motor, to stop said motor, to cause said antenna system to stop directed toward said selected station.

19. In a short-wave communication system having a central office and a plurality of mobile stations remotely disposed thereabout, each of said stations having a transmitter and a receiver, directional antennas mounted on each mobile station and connected to the transmitter and receiver at each station for communication with said central office, a directional antenna system rotatively mounted at said central office, said antenna system so mounted as to scan each of said stations successively as said antenna system is rotated, a motor coupled to said antenna system for continuously rotating said antenna system preparatory to an extension of a call from said central office and preparatory to the reception of a carrier wave from any one of said stations, an operating circuit for said motor whereby said motor operates to continuously rotate said antenna system, means at said central office for selecting one of said stations, means associated with said motor circuit operated responsive to said last mentioned means for breaking said operating circuit for said motor to cause said motor to stop thereby causing said antenna system to stop directed toward said selected station, means at said central office associated with said rotating antenna system operated responsive to a carrier wave received by said rotating antenna system from one of said stations to break said operating circuit for said motor to cause said motor to stop thereby causing said antenna system to stop directed toward said selected station, a second motor, said second motor coupled to said antenna system for continuously rotating said antenna system as one of said mobile stations is moved respective to said central office, an operating circuit for said second motor, said operating circuit for said second motor comprising a balanced amplifier and means for completing said operating circuit, means associated with said operating circuit for said first motor for operating said last mentioned means only when the operating circuit for said first motor is open whereby said second motor operates only after said first motor has stopped, a pair of horizontally directional antennas mounted on said rotating antenna system to rotate with said antenna system, said horizontally directional antennas connected to said balanced amplifiers so that a carrier wave transmitted to said antenna system and received by said horizontally directional antennas will balance or unbalance said amplifiers to an extent dependent upon the direction from which said carrier wave is received, said balanced amplifiers connected in the operating circuit of said second motor to cause said motor to operate in the direction which rotates said antenna system to result in a directional alignment of said horizontally directional antennas to said moving station to balance said amplifiers.

20. In a short-wave communication system having a central office and a plurality of mobile stations remotely disposed thereabout, an antenna system rotatively mounted at said central office, said antenna system comprising a directional receiving antenna and a pair of horizontally spaced tracking antennas, said antenna system so mounted as to scan each of said stations as said antenna system is rotated, a motor coupled to said antenna system for continuously rotating said antenna system preparatory to the reception of a carrier wave from any one of said stations, an operating circuit for said motor whereby said motor operates to continuously rotate said antenna system, means at said central office operated responsive to the reception by said receiving antenna of a carrier wave from one of said stations when said station is scanned by said receiving antenna for breaking the operating circuit for said motor thereby causing said antenna system to stop directed toward said one station, a second motor coupled to said antenna system for rotating said antenna system as said one station is moved respective to said central office, a pair of balanced amplifiers, each of said amplifiers connected to include part of the field windings of said second motor, said second motor being a reversable motor whereby said motor operates in either direction dependent upon the relative strength of the field windings, each of said amplifiers connected to one of said horizontally spaced tracking antennas so that said amplifiers are relatively balanced and unbalanced dependent upon the direction from which said carrier wave is received, an operating circuit for said second motor, said operating circuit for said second motor completed by said means which breaks the operating circuit for said first motor whereby said second motor begins to operate when said first motor stops, said second motor operating in a direction dependent upon the degree of unbalance between said amplifiers.

EVERHARD H. B. BARTELINK.

References Cited in the file of this patent

UNITED STATES PATENTS

| Number | Name | Date |
|---|---|---|
| 2,063,534 | Wallace | Dec. 8, 1936 |
| 2,152,329 | Schussler | Mar. 28, 1939 |
| 2,234,244 | Gossel | Mar. 11, 1941 |
| 2,257,319 | Williams | Sept. 30, 1941 |
| 2,401,759 | Hersey | June 11, 1946 |
| 2 550 700 | Lancor | May 1, 1951 |